(12) United States Patent
Ito et al.

(10) Patent No.: US 6,428,091 B2
(45) Date of Patent: Aug. 6, 2002

(54) SUNROOF APPARATUS

(75) Inventors: Nobuo Ito; Masanobu Ohtsu, both of Yokohama (JP)

(73) Assignee: OHI Seisakusho Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/766,370

(22) Filed: Jan. 19, 2001

(30) Foreign Application Priority Data

Jan. 19, 2000 (JP) ........................................ 2000-009772

(51) Int. Cl.[7] .................................................. B60J 7/05

(52) U.S. Cl. ...................................... 296/221; 296/223

(58) Field of Search ................................... 296/221, 223

(56) References Cited

U.S. PATENT DOCUMENTS

| | | | |
|---|---|---|---|
| 4,629,953 A | * 12/1986 | Inoue et al. | 296/223 X |
| 5,185,562 A | * 2/1993 | Huyer | 296/223 X |
| 6,290,289 B1 | * 9/2001 | Ohtsu et al. | 296/221 |

FOREIGN PATENT DOCUMENTS

| JP | 404078721 | * 3/1992 | 296/221 |
|---|---|---|---|

* cited by examiner

*Primary Examiner*—Dennis H. Pedder
(74) *Attorney, Agent, or Firm*—Kilpatrick Stockton LLP

(57) ABSTRACT

A lid (23) is movable to have a full-close position, a tilt-up position, a flap position, and a full-open position relative to a roof opening (2), and is stopped at the tilt-up position, when moving in a roof-opening direction, but is kept from stopping at the tilt-up position, when moving in a roof-closing direction.

4 Claims, 13 Drawing Sheets

F/C→TILT-UP

FIG.13

TILT-UP STOP (LIMIT DETCTION)

FIG.14

TILT-UP HELD (SW OFF)

FIG.15

TILT-UP →F/O

SUNROOF APPARATUS

BACKGROUND OF THE INVENTION

1. Field of the Invention

The present invention relates to a sunroof apparatus, and in particular, to a sunroof apparatus that can prevent forgetting to close a lid of which a tilt-up position is set to be intermediate in a longitudinal movement range thereof.

2. Description of the Related Art

A vehicular sunroof apparatus is arranged with a lid that is movable in a vehicle-longitudinal direction along an opening formed in a vehicular roof, to thereby open and close the opening (like Japanese Utility Model Application Laid-Open Publication No. 8-5852). The lid is configured to have, on the way of longitudinal movement, a full-close position where it shuts up the opening, a full-open position where it is accommodated in the roof, behind the opening, to make the opening released free, and a tilt-up position where its rear end rises above an opening plane.

As used herein, the term "opening plane" means an imaginary plane that interconnects opening edges.

Conventionally, the full-close position of the lid is set to be intermediate in a longitudinal movement range of a lid slider, and the slider is moved forward for the lid to have the tilt-up position, or backward for the lid to have the full-open position.

The lid is required to meet a positioning condition to be severe enough to secure water-tightness and prevent wind-cutting sounds. At the full-close position, the positioning condition should be severest.

In the conventional art, however, the full-close position is located at an intermediate part of the longitudinal movement range of lid slider, where the positioning of lid is relatively unstable, as the lid is movable in both forward and rearward directions.

As a result, the conventional sunroof apparatus needs a complicate position holding mechanism that can keep a lid position from movements in both directions.

SUMMARY OF THE INVENTION

One may suppose a new arrangement for a lid to have a full-close position set at a front end of a longitudinal movement range of a lid slider, a tilt-up position at an intermediate location in that range, and a full-open position at a rear end of the range, so that a stable positioning of the lid can be effected at the full-close position by simply abutting the lid on a front end of an opening in a sunroof.

In the new arrangement, however, when closing the lid, as well as when opening, the lid experiences the tilt-up position, where it stops once. To close the lid to an end, an operation switch should be kept pressed. When the lid stops at the tilt-up position, its drive motor is stopped, with motor sounds interrupted. One may mistake to hear the interruption of motor sounds as an indication of an established lid position to be the full-close or full-open position. If it is mistaken to be an indication of the full-close position, one may goes out the vehicle, leaving the lid in the tilt-up position, which is unfavorable from the viewpoint of theft prevention or for fear of a possible invasion of rain or car washing water.

The present invention is made with such points in view. It therefore is an object of the present invention to provide a sunroof apparatus that can prevent a lid-open state from being mistaken as a closed state.

To achieve the object, according to an aspect of the invention, there is provided a sunroof apparatus comprising: a roof opening formed in a vehicular roof, with an opening plane extending in a direction; a lid member movable in said direction, between first and second ends of a movement range, to have a full-close position at the first end, where the lid member fully closes the roof opening, a tilt-up position, where the lid member has an end part thereof above the opening plane, a flap position, where the lid member has the end part thereof below the opening plane, and a full-open position at the second end, where the lid member fully opens the roof opening; a drive system for driving the lid member to move; and a control system for controlling the drive system so that the lid member is stopped to have the tilt-up position, when moving toward the second end, and kept from being stopped to have the tilt-up position, when moving toward the first end.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

There will be detailed below a preferred embodiment of the present invention with reference to the accompanying drawings. Like members are designated by like reference characters.

Description is now made of constitution and basic functions of a sunroof apparatus according to the embodiment, with reference to FIG. 1 to FIG. 10. A vehicular roof 1 elongate in a longitudinal direction of a vehicle is formed with a substantially rectangular roof opening 2 for sunroof. Along both sides of the opening 2 are disposed a pair of extruded side rails 3 (to be left and right side rails relative to the vehicle) in a symmetrical relationship. The side rails 3 have their front ends interconnected by combination of corner members 4 and a front rail 5 extending in a transverse direction of the vehicle.

Each side rail 3 has a transverse section configured, as shown in FIG. 6 to FIG. 9, at the transversely outer side of a flat base with an outwardly bent flange 6, at a central part of the base with an inwardly open channel 10, and at the inner side of the base with a mount portion three-staged to have an inwardly open lower groove 8 for engagement with a mount clip 7a at an end of a roof lining 7, an outwardly open middle groove 9 in opposition to the channel 10, and an inwardly open upper groove 12 for engagement with a shade 11.

A longitudinal part of channel 10 is cut out upwardly for installation of a stopper 13. The stopper 13 has a pair of front and rear guide walls 14 and 15 projecting upward out of the cutout. The guide walls 14 and 15 transversely extend in parallel, and inclined rearward.

Figure 1:
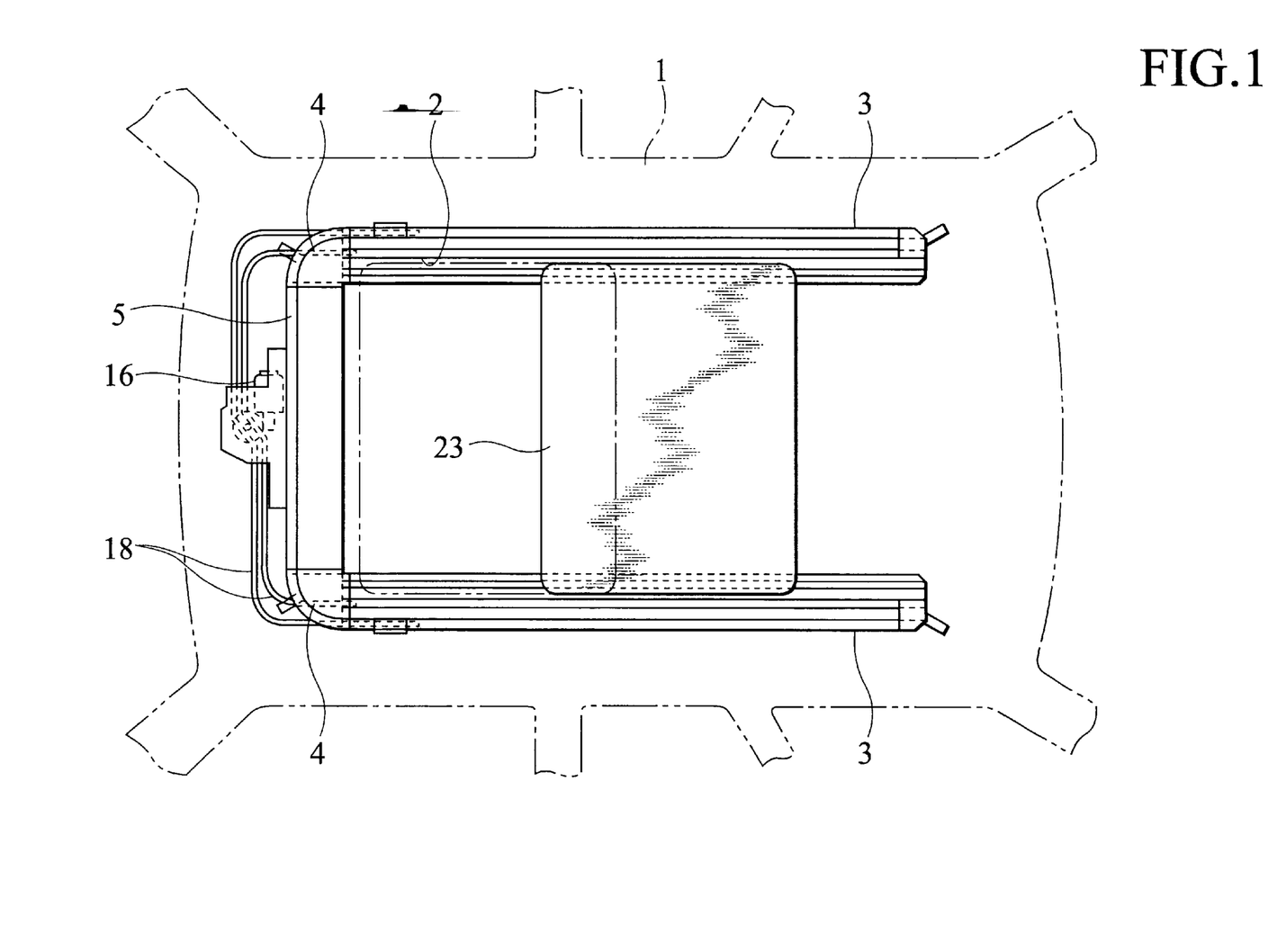
FIG. 1 is a plan of a sunroof apparatus according to an embodiment of the invention.

On a central part of the front rail 5 is installed a motor 16, with drive cables 17 extending therefrom through protecting guide pipes 18 on both sides of the motor 16 (as in FIG. 1). Each cable 17 extends, at one side, via a location of corner member 4, through a round groove in channel 10 of the side rail 3 (as in FIG. 6 to FIG. 9), and at the other side, via a location of opposite corner member 4, under flange 6. The cable 17 is engaged with a gear of the motor 16, and is driven forth or back in dependence on a rotation of the motor 16.

Figure 8:
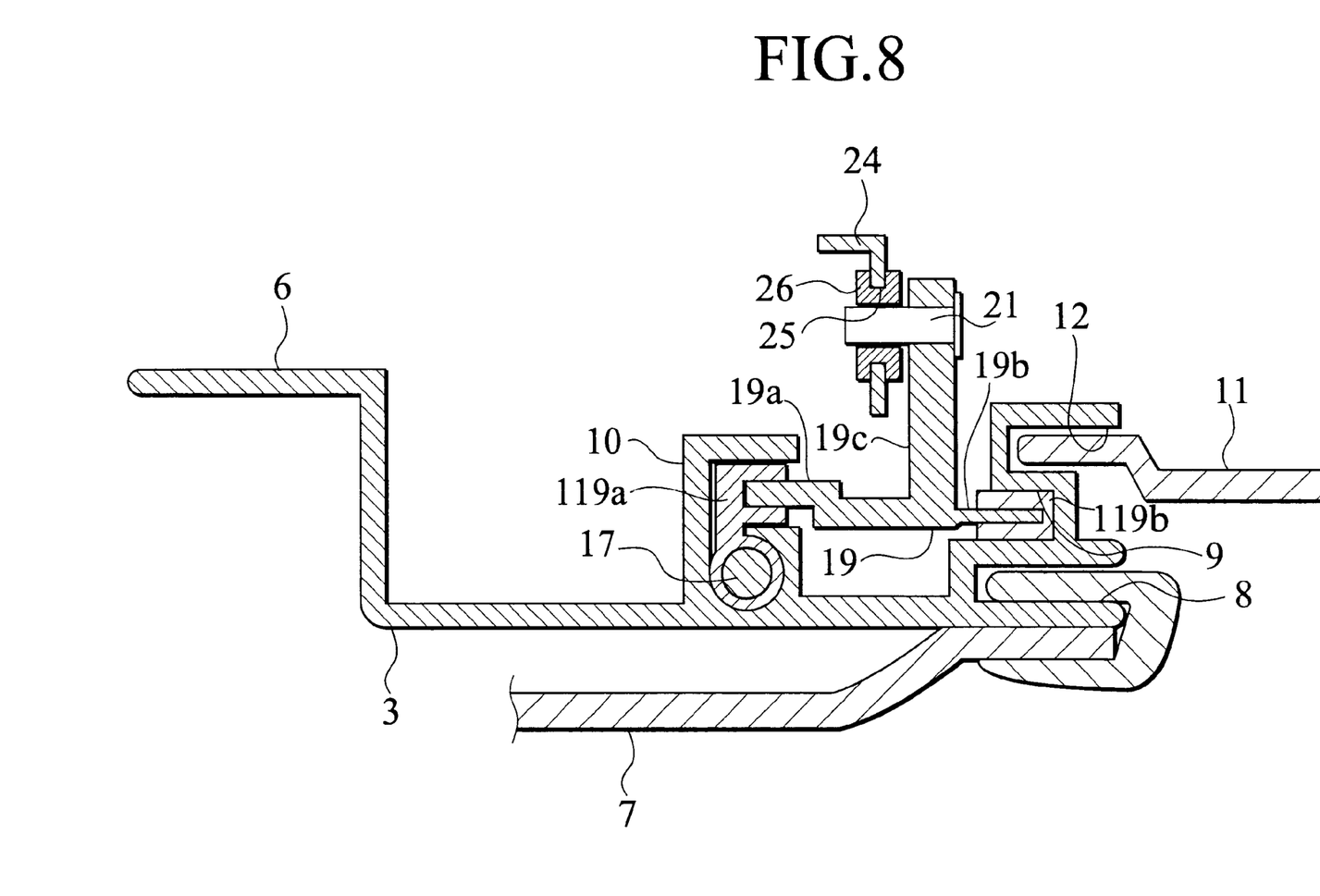
FIG. 8 is a section along line SC—SC of FIG. 2.
Figure 9:
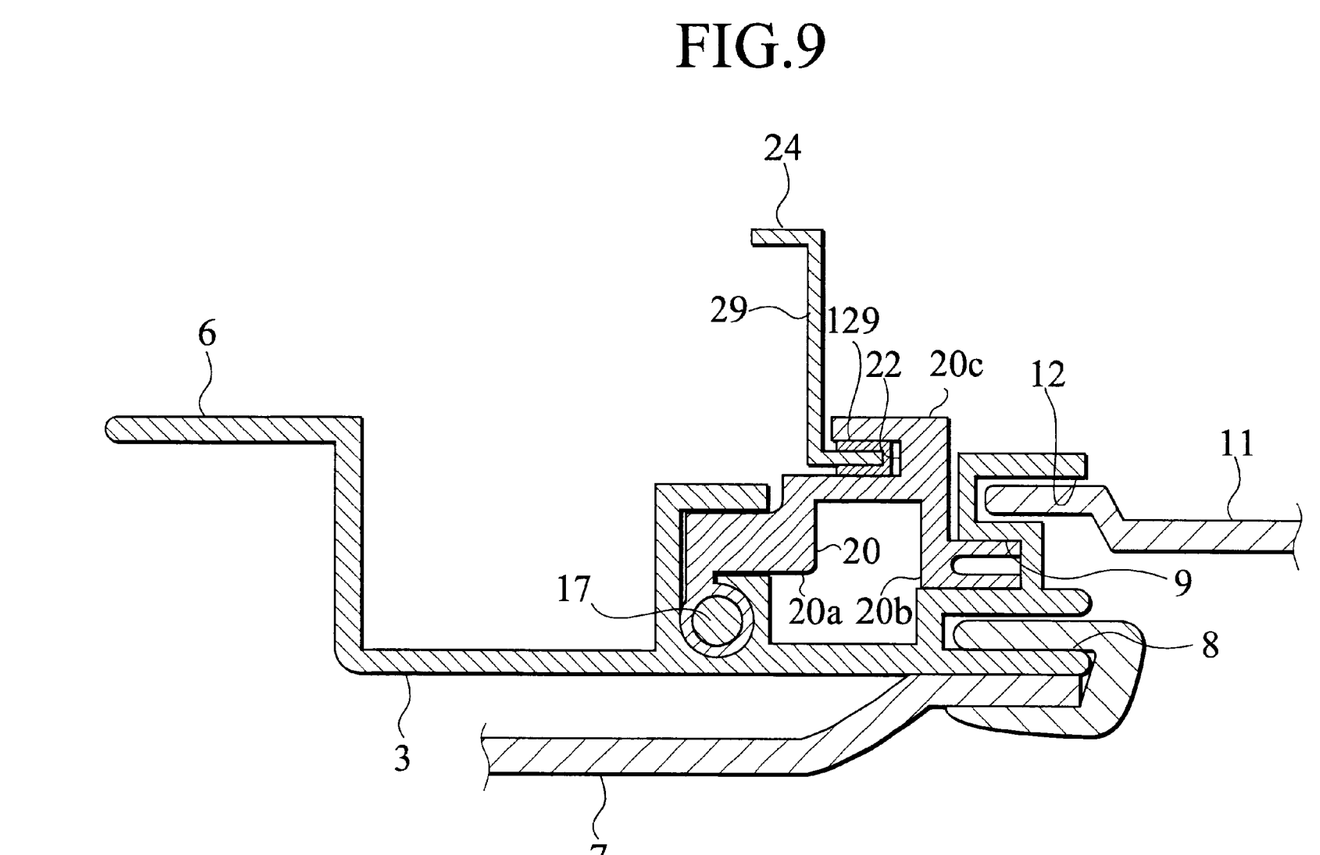
FIG. 9 is a section along line SD—SD of FIG. 2.

Cable 17 is connected to a slider 19 and a hook 20. As shown in FIG. 8 and FIG. 9, the slider 19 and the hook 20 are longitudinally movably mounted to side rail 3. More specifically, the slider 19 (FIG. 8) is formed with a left edge 19a engaged with a slide piece 119a, which is fitted in the channel 10 and engaged with the cable 17, and a right edge 19b engaged with a slide piece 119b, which is fitted in the groove 9. The hook 20 (FIG. 9) is formed with a left slide part 20a, which is fitted in the channel 10 and engaged with the cable 17, and a right slide part 20b, which is fitted in the groove 9. The slider 19 has an upward projection 19c, which has a transversely outwardly extending guide pin 21 fixed thereto. The hook 20 has a raised part 20c, which is formed with a transversely outwardly open groove or engagement part 22.

Figure 7:
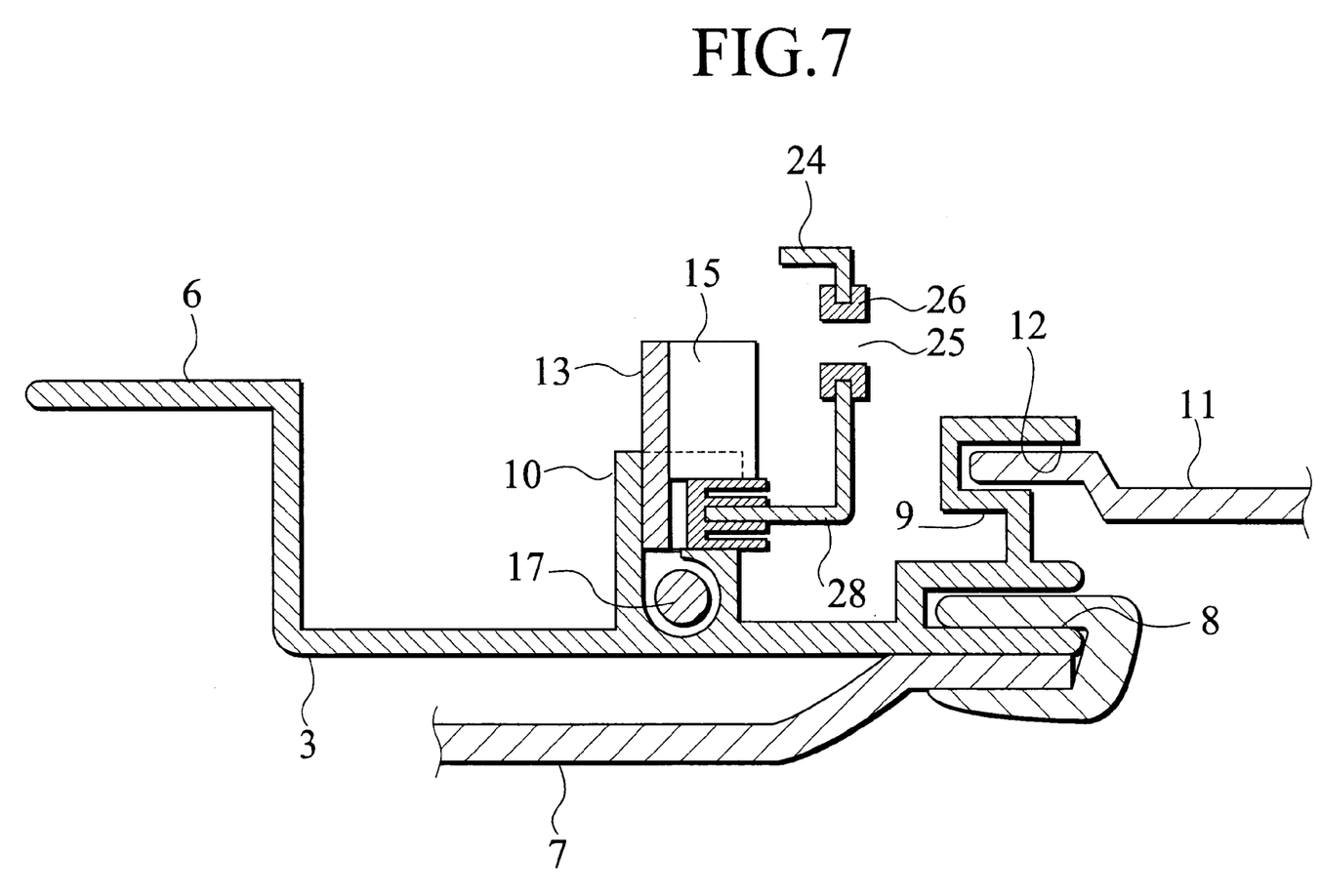
FIG. 7 is a section along line SB—SB of FIG. 2.

The roof opening 2 can be shut with a longitudinally and transversely extending lid 23. Each longitudinal side part of the lid 23 has at the downside a longitudinally and vertically extending guide member 24 fixed thereto. As shown in FIG. 2 to FIG. 5, the guide member 24 has a guide groove 25 cut therethrough as a cam groove that extends (in a full-close position of the lid 23, FIG. 2) substantially horizontally at a front part 25a, downwardly obliquely in a relatively steep fashion at a front intermediate part 25b, again downwardly obliquely but in a moderate fashion at a rear intermediate part 25c, and upwardly obliquely at a rear part 25d. As shown in FIG. 7 and FIG. 8, both edges of the guide groove 25 have covers 26 put thereon, for engagement with the guide pin 21 to be inserted therebetween from transversely inner side and to be longitudinally slid along the groove 25. It should be noted that the guide groove 25 with covers 26 may be any cam element else that can operatively engageable with the guide pin 21. Note that the covers 26 are omitted in FIG. 2 to FIG. 5. The covers 26 may be vertically extended or interconnected at their transversely outer sides for concealing a distal end of the guide pin 26 and/or the groove 25 to provide a better appearance.

Figure 2:
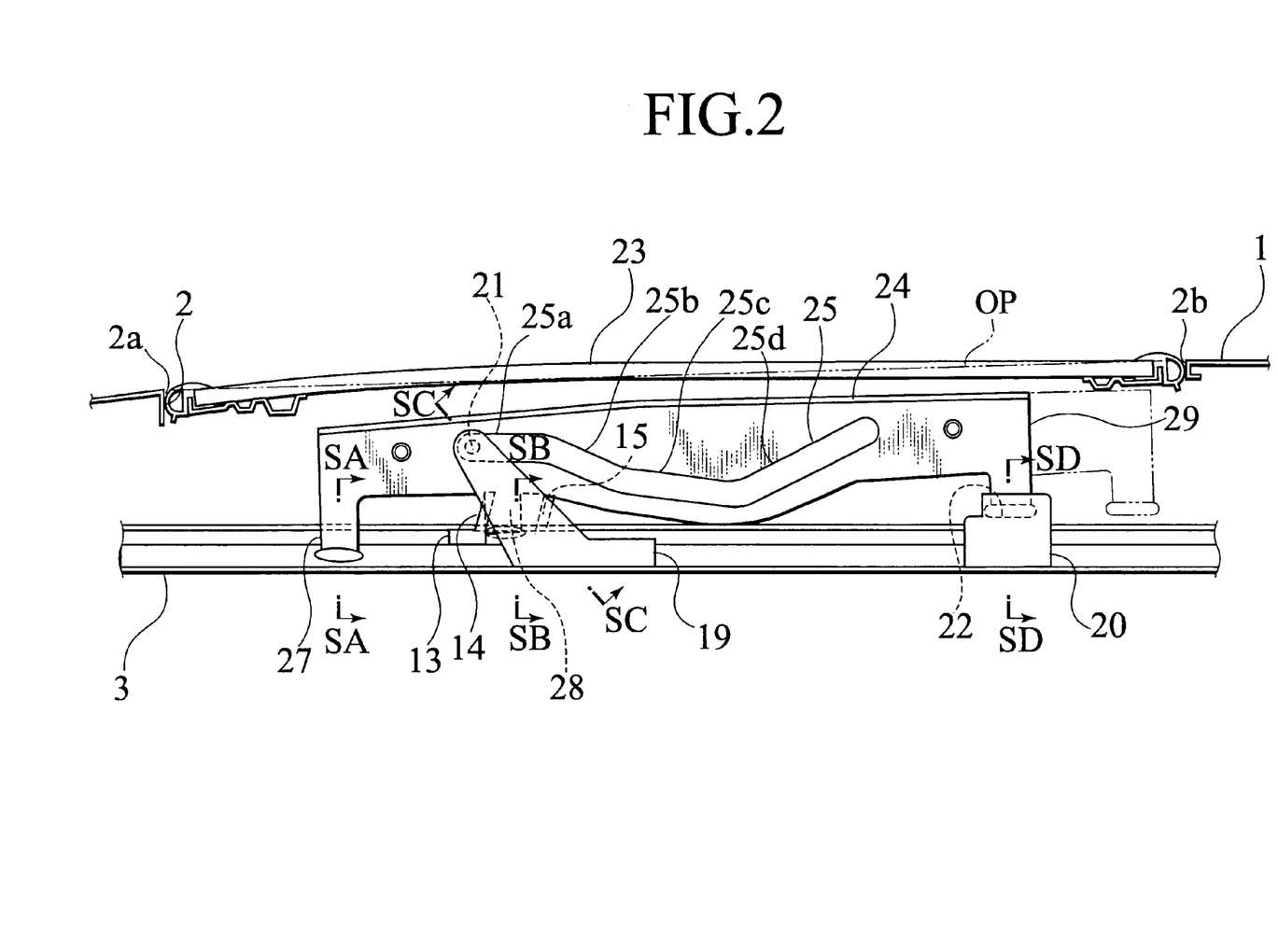
FIG. 2 is a section of the sunroof apparatus of FIG. 1, in which a lid has a full-close position.

The guide member 24 has a front leg 27, an intermediate leg 28, and a rear leg 29 (FIG. 2). The front leg 27 is bent at the lower end, transversely inward as in FIG. 6, to be fixed in a slide piece 124, which is longitudinally slidably fitted in the groove 9 in a rotatable or angularly movable manner. Alternately, the lower end of the front leg 27 may be hinged or pivoted on a separate bracket slidably fitted in the groove 9.

The intermediate leg 28 is formed under a front half of the guide member 24, substantially below the front part 25a of the guide groove 25, and is vertically slidably fitted at the lower end between the front and rear guide walls 14 and 15, without undue longitudinal plays that might have caused the leg 28 to rattle.

The rear leg 29 also is bent at the lower end, transversely inward as in FIG. 9, to be fixed in a slide piece 129, which is longitudinally slidably fitted in the engagement part 22 when the lid 23 has the full-close position, for restricting vertical movement of the leg.

The lid 23 is integrally movable with left and right guide members 24. A drive system for driving the lid 23 to move is constituted with the left and right guide members 24, rails 3, sliders 19, hooks 20, cables 17, motor 16, etc.

Next, description is made of actions of the lid 23, with reference to FIG. 10 to FIG. 16, as well as to FIG. 2 to FIG. 5. Mechanical actions are described with respect to one side of the sunroof apparatus, for simplicity.

Figure 3:
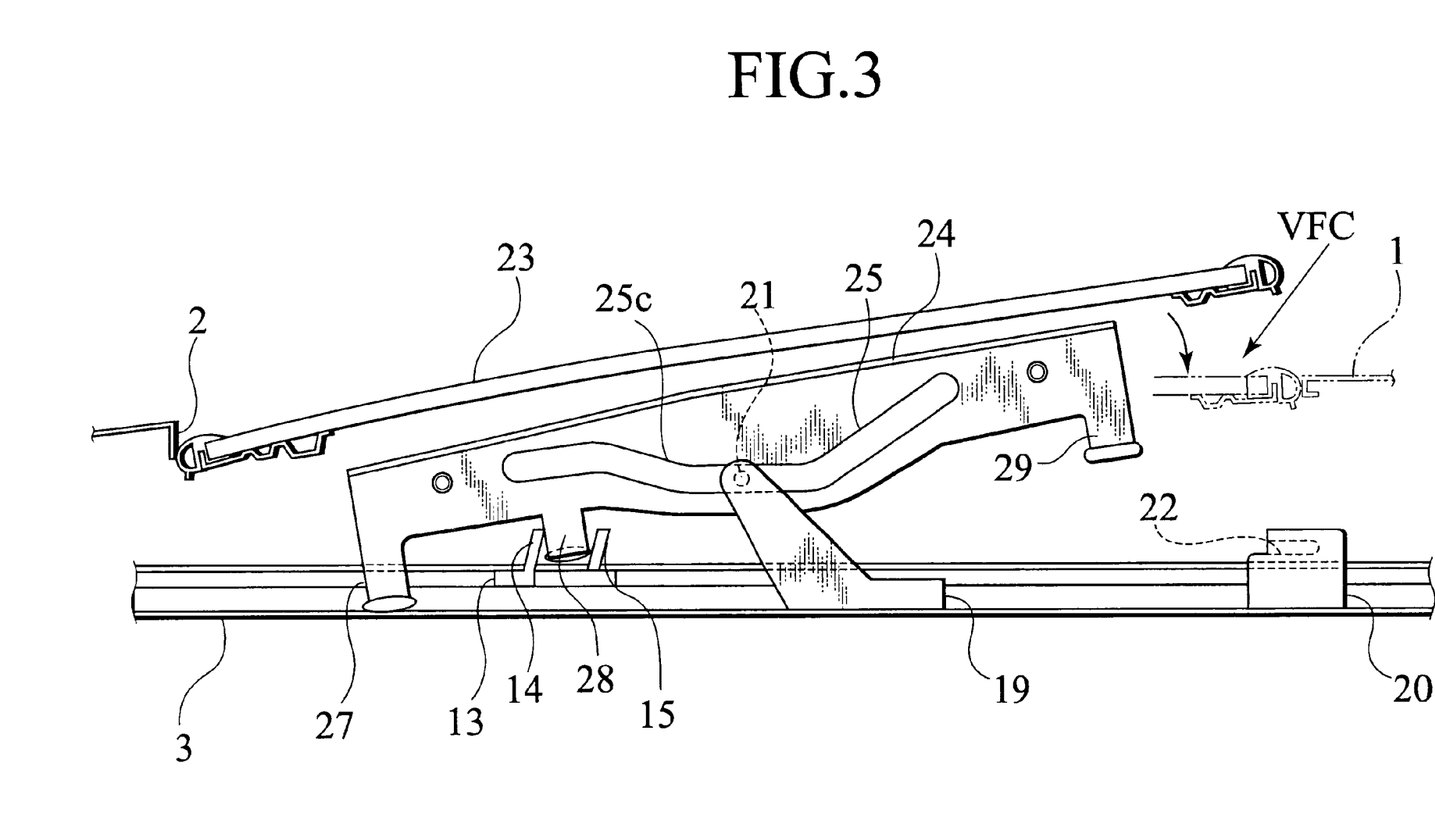
FIG. 3 is a section of the sunroof apparatus of FIG. 1, in which the lid has a tilt-up position.
Figure 4:
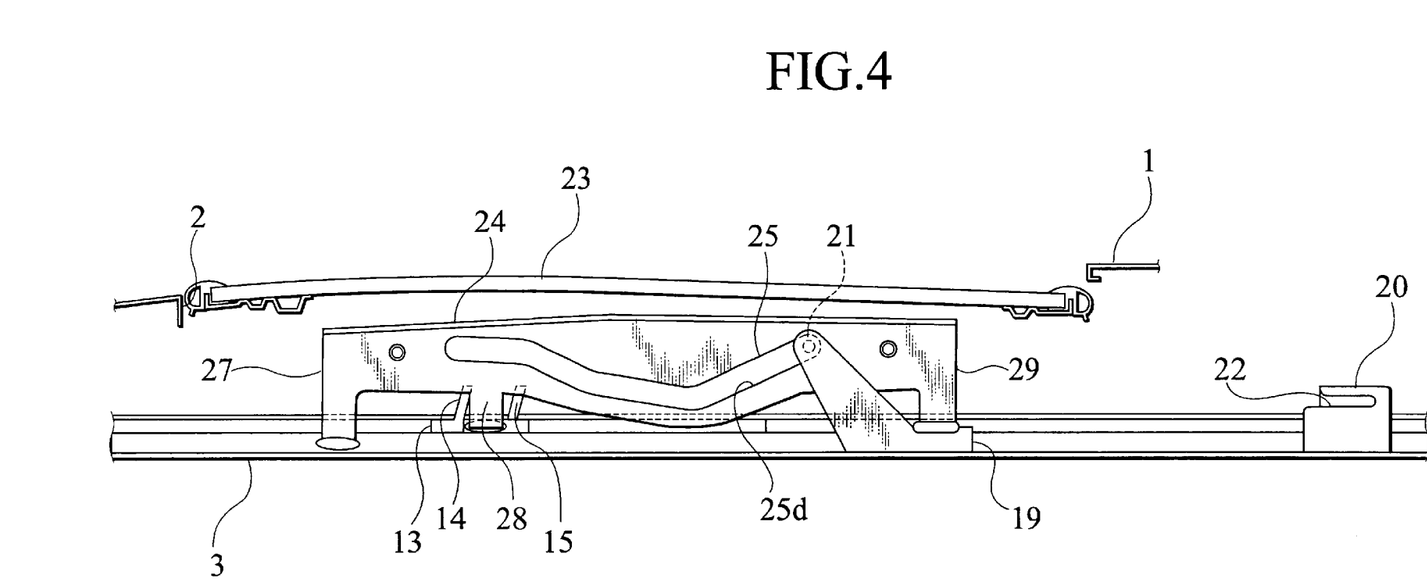
FIG. 4 is a section of the sunroof apparatus of FIG. 1, in which the lid has a flap position.
Figure 5:
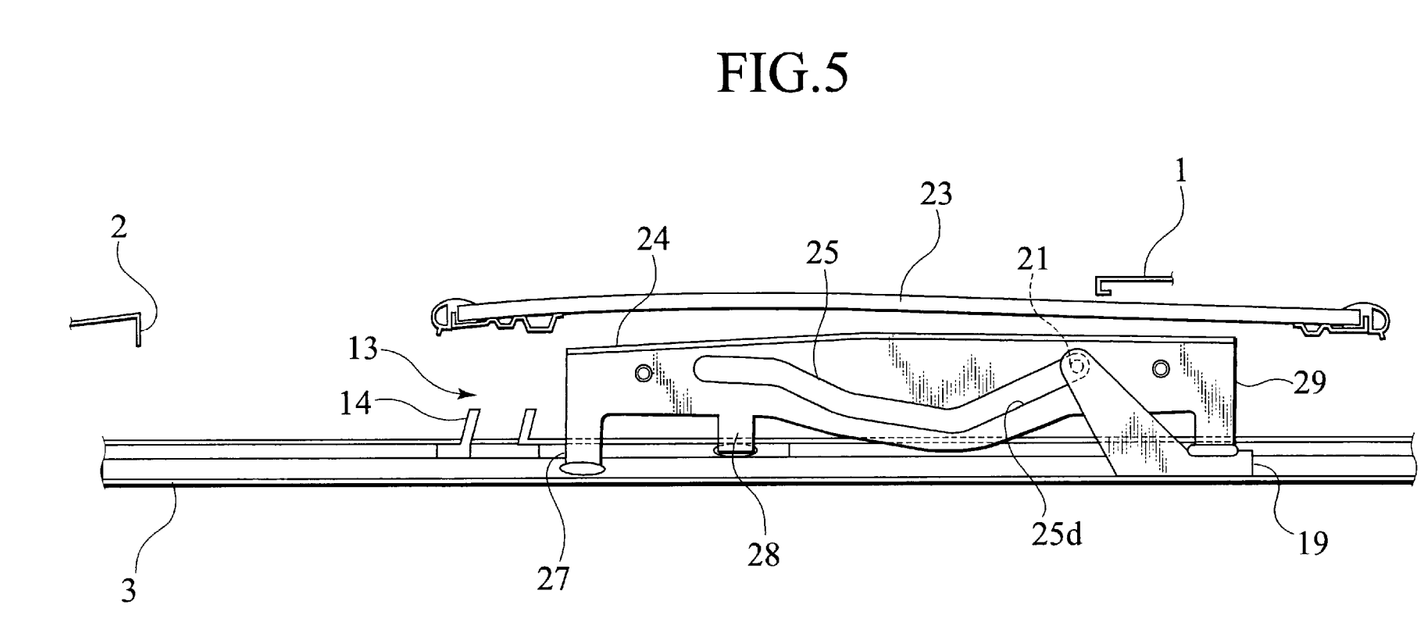
FIG. 5 is a section of the sunroof apparatus of FIG. 1, in which the lid is in way of movement toward a full-open position.
Figure 6:
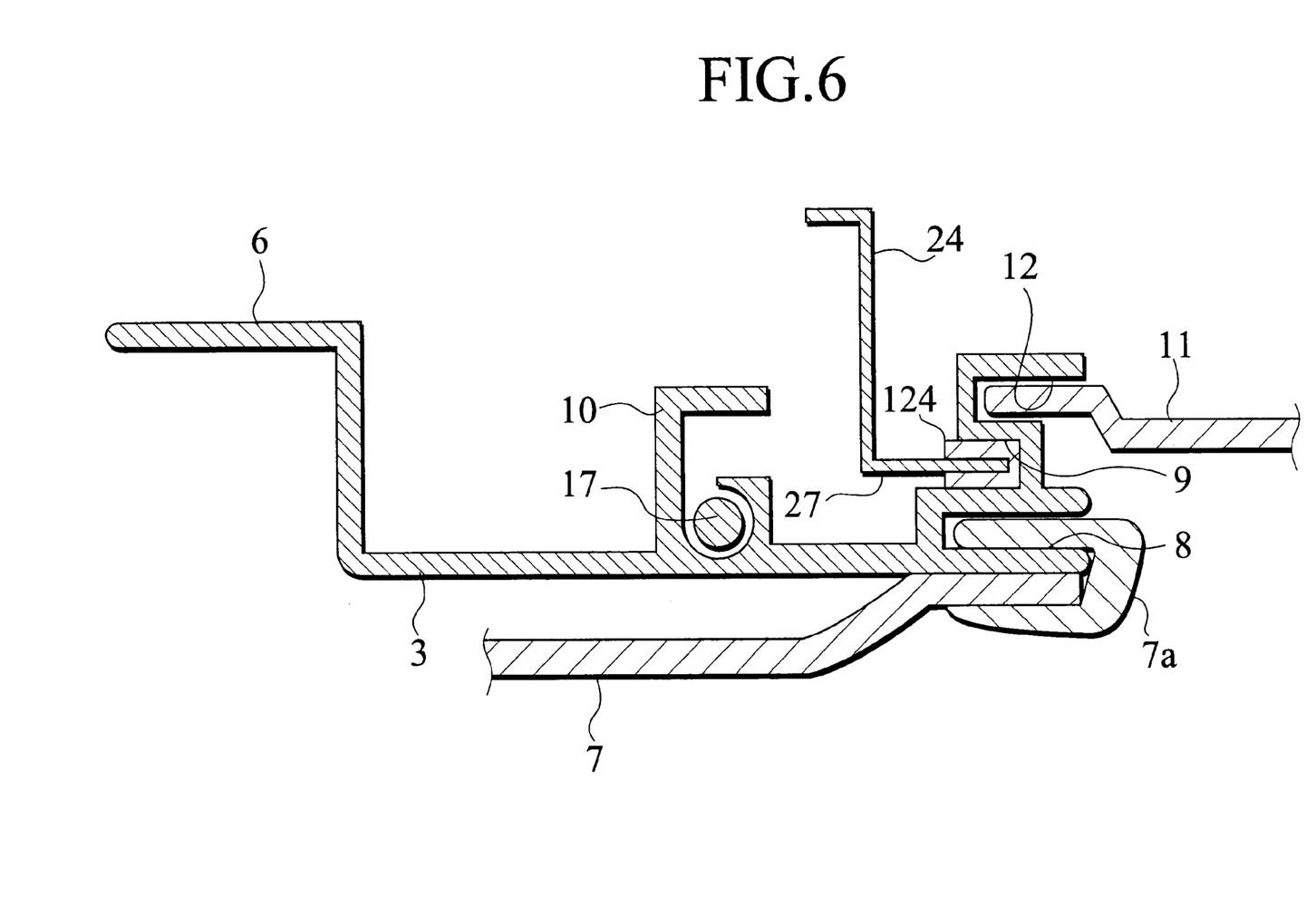
FIG. 6 is a section along line SA—SA of FIG. 2.

FIG. 2 shows the lid 23 in the full-close position (F/C), FIG. 3 shows the lid 23 in a tilt-up position in solid line and a virtual full-close position (VFC) in phantom line, FIG. 4 shows the lid 23 in a flap position, and FIG. 5 shows the lid 23 moving toward a full-open position (F/O).

Figure 10:
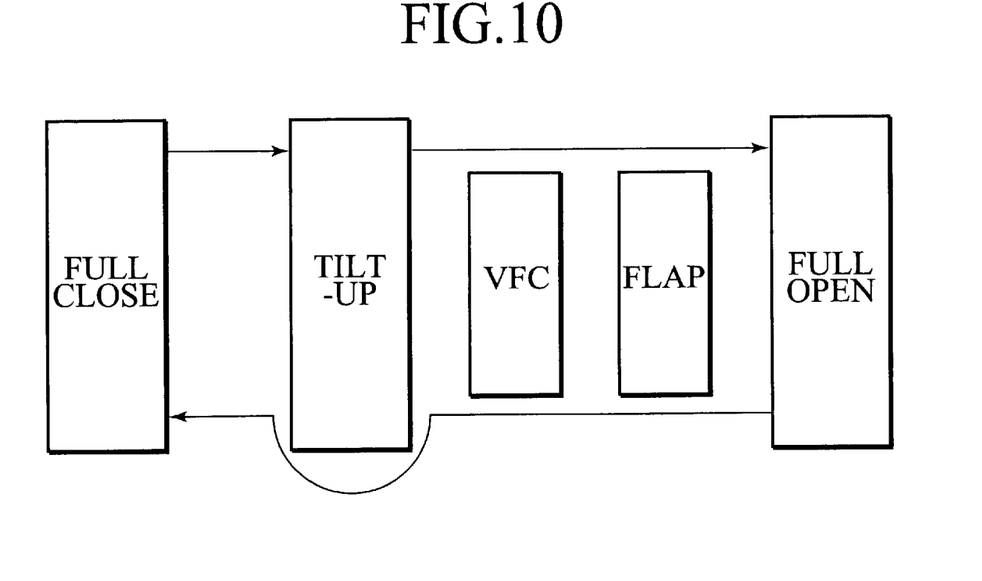
FIG. 10 is a chart of a schematic control flow of a controller of the sunroof apparatus of FIG. 1.
Figure 11:
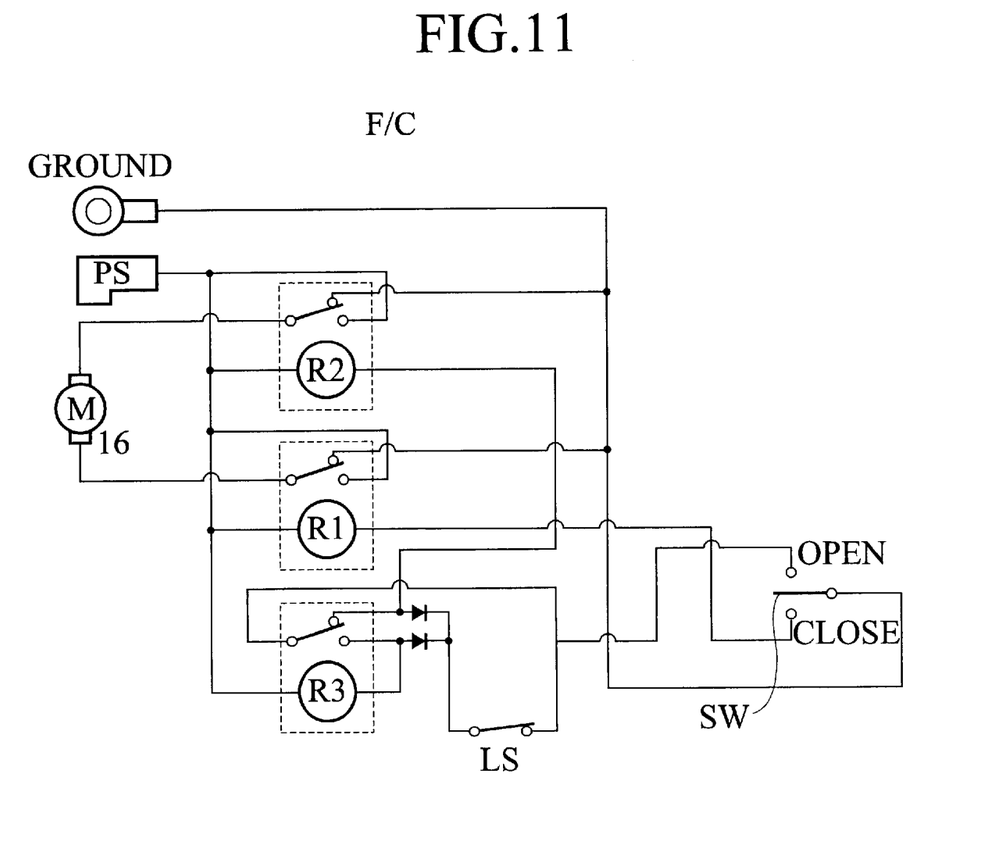
FIG. 11 is a circuit diagram of the sunroof apparatus of FIG. 1 describing a state in which the lid has the full-close position.
Figure 12:
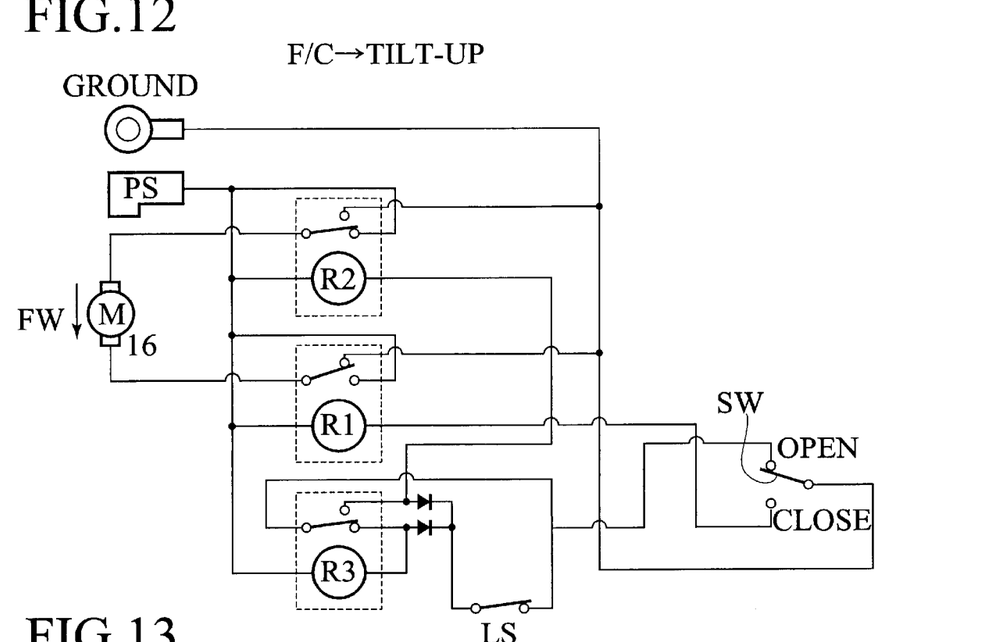
FIG. 12 is a circuit diagram of the sunroof apparatus of FIG. 1 describing a state in which the lid is moving from the full-close position to the tilt-up position.
Figure 13:
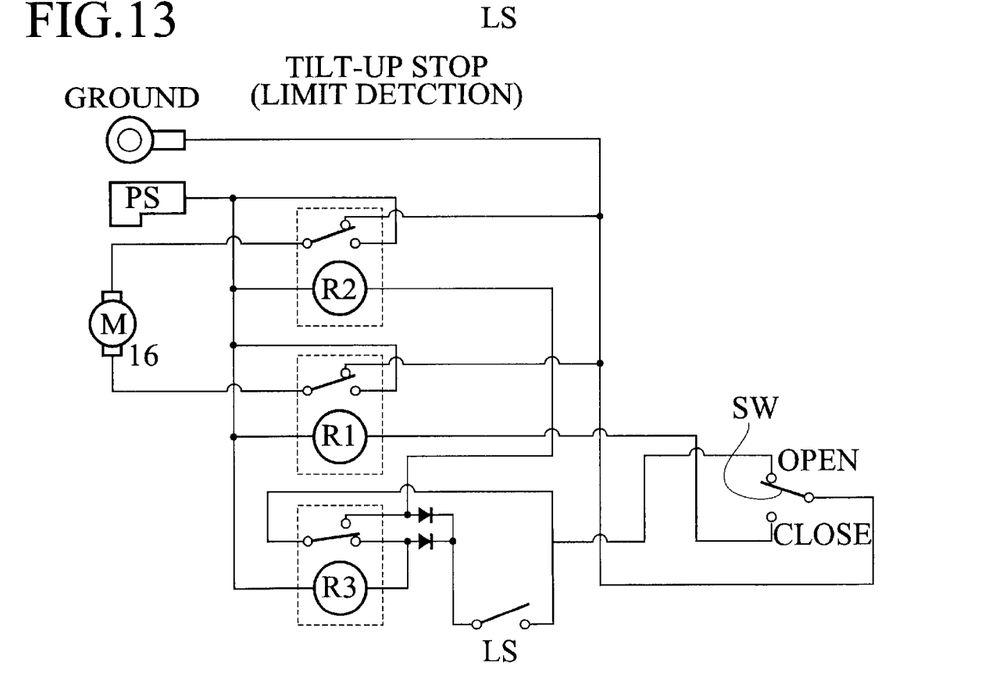
FIG. 13 is a circuit diagram of the sunroof apparatus of FIG. 1 describing a state in which the lid is stopped to have the tilt-up position.
Figure 14:
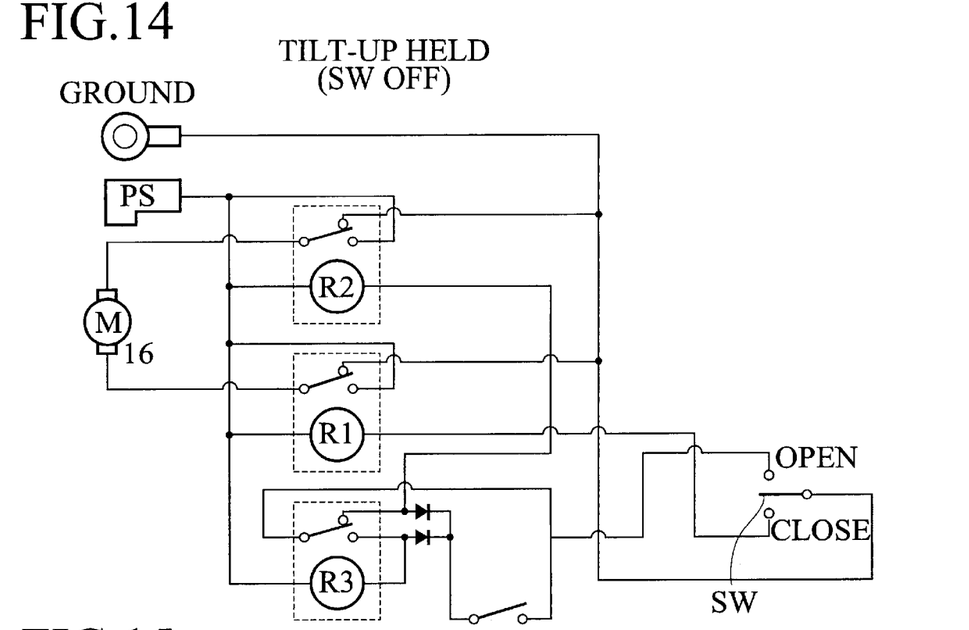
FIG. 14 is a circuit diagram of the sunroof apparatus of FIG. 1 describing a state in which the lid is kept to the tilt-up position, with an associated switch off.
Figure 15:
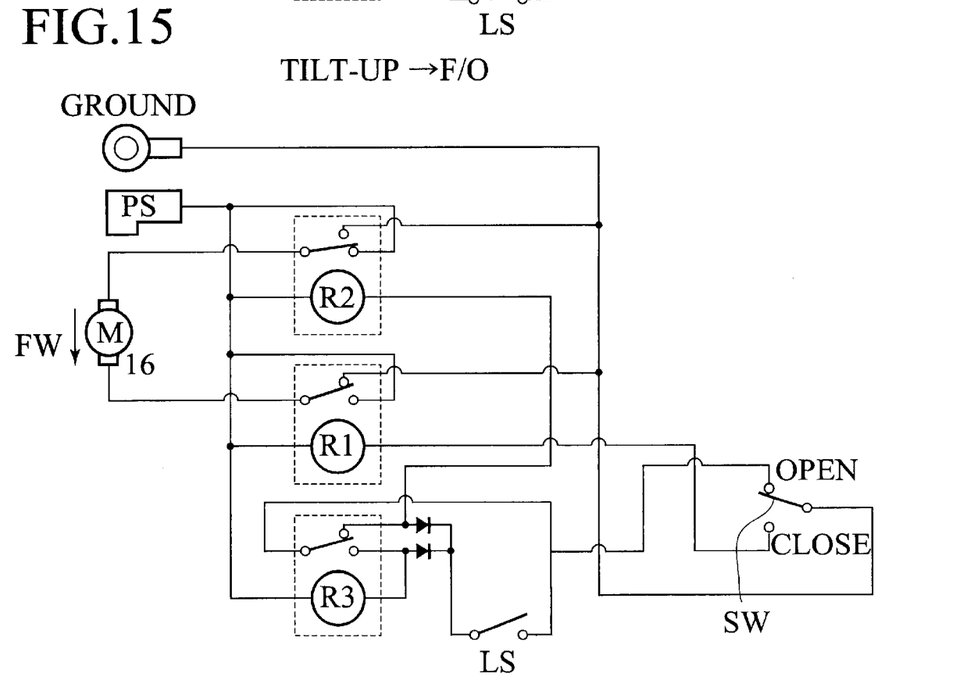
FIG. 15 is a circuit diagram of the sunroof apparatus of FIG. 1 describing a state in which the lid is in way of movement from the tilt-up position to the full-open position.
Figure 16:
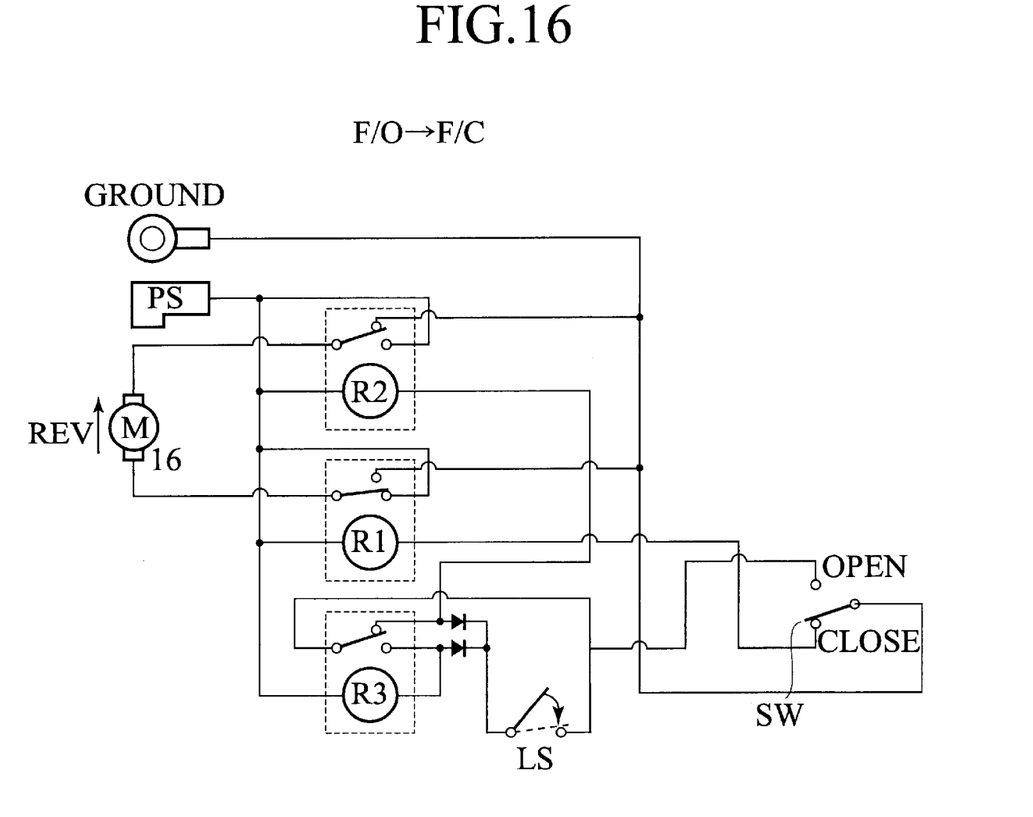
FIG. 16 is a circuit diagram of the sunroof apparatus of FIG. 1 describing a state in which the lid is in way of movement from the full-open position to the full-close position.

FIG. 10 illustrates schematic control flow of a control system for controlling the before-mentioned drive system. The control system includes a control circuit of which various working states defined by associated lid positions are shown in FIG. 11 to FIG. 16. FIG. 11 shows an F/C state, FIG. 12 shows a transition from the F/C state to a tilt-up state, FIG. 13 shows a lid stopping state for tilt-up, FIG. 14 shows a tilt-up holding state, FIG. 15 shows a transition from the tilt-up state to an F/O state, and FIG. 16 shows a transition from the F/O state to the F/C state.

First, in the full-close position (FIG. 2), the lid 23 shuts or fully closes the roof opening 2, with a front end of the lid 23 in contact with a front end of the opening 2, with the guide pin 21 of the slider 19 in abutment with a front end of the guide groove 25. As will be seen from FIG. 11, in the F/C state, no drive current is conducted through the motor 16 connected between a power supply PS and a ground, via the control circuit in which an operation switch SW is now neutral and three relays R1 to R3 are de-energized, while a limit switch LS is close. The lid 23 is thus not moved nor rattling, in particular in the longitudinal direction. As the lower end of the rear leg 29 is engaged with the engagement part 22 of the hook 20, the lid 23 is kept from rattling in the vertical direction, as well.

Next, as shown in FIG. 12, the switch SW is operated to a roof-opening end OPEN. Relays R2 and R3 are energized to have changed connections, conducting a drive current through the motor 16. As the motor 16 rotates in a forward direction FW, the cable 17 is driven rearward, driving the slider 19 and the hook 20 rearward, that is, in a roof opening direction.

The guide pin 21 exits the front part 25a of the guide groove 25, and follows the front intermediate part 25b, causing the guide member 24 to start gradually swinging upward about the lower end of the front leg 27. As the guide pin 21 enters the rear intermediate part 25c of the guide groove 25, the lid 23 is swung up together with the guide member 24, so that a rear end of the lid 23 is raised above an opening plane OP, that is a flat plane extending between front and rear top edges 2a and 2b of the roof opening 2, to have a specified tilt-up position (FIG. 3). A rotation angle of the motor 16 or corresponding quantity, such as a driven length of the cable 17, is directly or indirectly detected for operation of the limit switch LS, which may be installed in a vicinity of an end of the guide pipe 18.

When the tilt-up position of the lid 23 is established, the limit switch LS is operated to open, de-energizing relay R2, causing the motor 16 to stop at a current angular position. As a result, the lid 23 in the tilt-up position stops movement (FIG. 13).

When the lid 23 swings upward to the tilt-up position, the intermediate leg 28 of the guide member 24 is raised together, along the guide walls 14 and 15 of the stopper 13. Because the guide walls 14 and 15 are inclined rearward, the lid 23 is displaced accordingly, so that the front end of the lid 23 is prevented from gouging (or forced contact on) the front end of the roof opening 2. The operation switch SW is kept operated to the OPEN end, until the lid 23 has the tilt-up position, when the motor 16 is automatically stopped by the limit switch LS. If this lid position is desirable, the operator then stops the switch operation. As a result, the switch SW returns to the neutral position, and relay R3 is de-energized, interrupting a circuit current (FIG. 14). Accordingly, the lid 23 is held in the tilt-up position.

Next, if the operation switch SW is operated again to the OPEN end (FIG. 15), relay R2 is energized. The motor 16 again rotates in the forward direction, causing the slider 19 to move yet rearward. When the guide pin 21 of the slider 19 is brought into abutment with a rear end of the rear part 25d of the guide groove 25, the lid 23 once has a virtual full-close position VFC (phantom line of FIG. 3), where it overlaps the opening 2 at a level flush with the roof 1, before the lid 23 takes a flap position (FIG. 4), where its rear end goes below the opening plane OP, to be slid as it is (FIG. 5) into a rear accommodation space in the roof 1, to have a full-open position, where its front end may well yet go down to avoid interference with the rear end of the roof opening 2.

Then, as in FIG. 10, to return the lid 23 from the full-open position to the full-close position, the operation switch SW is once released to the neutral position, whereby relay R2 is de-energized, and then the switch SW is operated to a roof-closing end CLOSE (FIG. 16), whereby relay R1 is energized. The motor 16 is rotated in a reverse direction REV, causing the slider 19 to move forward (FIG. 5), that is in a roof closing direction. Up to the flap position, the lid 23 is moved forward with the guide pin 21 kept engaged with the rear end of the guide groove 25.

At the flap position (FIG. 4), the intermediate leg 28 of the guide member 24 engages between the front and rear guide walls 14 and 15 of the stopper 13, whereby the forward movement of the lid 23 is stopped. Here, the rear leg 29 of the guide member 24 has not yet been engaged with the hook 20, and is free from vertical restraint. As the slider 19 is driven forward, the guide pin 21 engaged with the rear part 25d of the guide groove 25 drives the lid 23 to swing upward, and enters the rear intermediate part 25c of the guide groove 25 (FIG. 3), causing the lid 23 to sequentially take the VFC position and the tilt-up position. As the slider 19 is driven yet forward, the limit switch LS is actuated (from solid line to broken line in FIG. 16). However, since the operation switch SW is kept operated to the CLOSE end, relays R2 and R3 are left as they are de-energized, while relay R1 is kept energized. Thus, the motor 16 keeps rotating in the reverse direction REV, and the slider 19 slides yet forward, driving the lid 23 to swing down to the full-close position (FIG. 2). An established F/C position may be detected. Finally, the operation switch SW is released to the neutral position, whereby relay R1 is de-energized (FIG. 11).

In a modification, the guide member 24 may have a restraint leg (shown in FIG. 2 by double-dotted chain line) provided behind the rear leg 29. The restraint leg may be released from a cutout part of the rail 3, allowing the lid 23 to move upward. Without restraint to the rear end of the lid 23, the guide pin 21 may move forward along the guide groove 25. Then, the intermediate leg 28 moving in the channel 10 may be kept from stopping at the tilt-up position, thus allowing the lid 23 to move as it is to the full-close position.

In the forward movement for closing the roof, unlike the rearward movement for opening, the lid 23 is kept from being stopped to have the tilt-up position. No current is conducted through the limit switch LS when the lid 23 moves forward. Although the limit switch LS is operated at the tilt-up position, the motor 16 will not stop. That is, in the roof closing direction, the limit switch LS is kept from functioning. Like this, in the roof closing direction, as the lid 23 is kept from stopping at the tilt-up position, no occupant mistakes to consider the tilt-up position as a full-close position. Moreover, necessary limit switch LS is single in number, costing low.

In the above embodiment in which no limit switch LS is provided for the flap position nor for the virtual close position, the lid 23 is inherently adapted to stop at neither of them. Therefore, occupant will not leave the lid 23 in neither position (flap position nor virtual close position) by mistake.

In the embodiment, the control system uses a limit switch to allow a lid to advance, without stopping at a tilt-up position, in movement in a roof closing direction. However, the control system may employ a computer, such as a vehicle-mounted microcomputer, to achieve like effects.

The operation switch SW may be a manual type that allows the lid 23 to move simply while the switch is operated, or an automatic type that allows the lid 23 to move to a specified position by one-touch operation. In either type, the lid 23 will pass through the tilt-up position in the forward movement, unless it is intentionally stopped. The manual type switch may be operated in an inching manner. In this case, lid condition is in conscious of the operator who will not leave the lid in a tilt-up position.

While a preferred embodiment of the present invention has been described using specific terms, such description is for illustrative purposes, and it is to be understood that changes and variations may be made without departing from the spirit or scope of the following claims.

What is claimed is:

1. A sunroof apparatus comprising:
    a roof opening formed in a vehicular roof
    a lid member for covering the roof opening;
    a drive system for driving the lid member, the drive system comprising a slider operatively linked with the lid member, a drive for driving the slider to be moved, along a path passing a first, a second, a third, and a fourth location, in selective one of a first direction for the slider to move toward the fourth location and a second direction for the slider to move toward the first location, and a set of restraints for restraining the lid member to have, as the slide is driven by the drive, one of     a full-close position, where the lid member is fitted in the roof opening to fully close the roof opening with the slider moved to the first location,     a tilt-up position, where the lid member is tilted up to have an end part thereof above an opening plane of the roof opening with the slider moved to the second location,     a flap position where the lid member is flapped down to have the end part thereof below the opening plane, with the slider moved to the third location, and     a full-open position, where the lid member is displaced to fully open the roof opening, with the slider moved to the fourth location; and a control system for controlling the drive     to stop the slider at the second location, so that the lid member is once held in the tilt-up position, as the slider is moved in the first direction, and     not to stop the slider at the second location, as the slider is moved in the second direction.

2. A sunroof apparatus according to claim 1, wherein the control system comprises:

a limit switch to be operated when the slider is moved to the second location; and     circuitry operable in response to the limit switch for controlling the drive         to stop the slider at the second location as the slider is moved in the first direction, and         not to stop the slider at the second location as the slider is moved in the second direction.

3. A sunroof apparatus according to claim 1, wherein the control system in operative for controlling the drive     to stop the slider at the third location so that the lid member is kept in the flap position, as the slider is moved in the first direction, and     not to stop the slider at the third location as the slider is moved in the second direction.

4. A sunroof apparatus according to claim 1, wherein the lid member is restrained by the set of restraints to have a virtual full-close position where the lid member overlaps the roof opening as the slider is moved to a fifth location between the second and the third location on the path, and     wherein the control system controls the drive not to stop the slider at the fifth location, as the slider is moved in the second direction.

* * * * *